United States Patent [19]

Bilkadi

[11] Patent Number: 5,104,929
[45] Date of Patent: Apr. 14, 1992

[54] ABRASION RESISTANT COATINGS COMPRISING SILICON DIOXIDE DISPERSIONS

[75] Inventor: Zayn Bilkadi, Mahtomedi, Minn.

[73] Assignee: Minnesota Mining and Manufacturing Company, St. Paul, Minn.

[21] Appl. No.: 381,488

[22] Filed: Jul. 18, 1989

Related U.S. Application Data

[63] Continuation of Ser. No. 180,057, Apr. 11, 1988, abandoned.

[51] Int. Cl.$^5$ ............................................. C08K 3/04
[52] U.S. Cl. ................................................. 524/847
[58] Field of Search ........................................ 524/847

[56] References Cited

U.S. PATENT DOCUMENTS

| | | | |
|---|---|---|---|
| 3,013,897 | 12/1961 | Cupery et al. | 117/46 |
| 3,753,769 | 8/1973 | Steiner | 117/122 |
| 4,221,697 | 9/1980 | Osborn et al. | 260/42.53 |
| 4,249,011 | 2/1981 | Wendling | 548/312 |
| 4,262,072 | 4/1981 | Wendling et al. | 430/14 |
| 4,310,600 | 1/1982 | Cross | 428/447 |
| 4,323,591 | 4/1982 | Wendling et al. | 427/53.1 |
| 4,348,462 | 9/1982 | Chung | 524/868 |
| 4,427,823 | 1/1984 | Inagaki et al. | 524/851 |
| 4,499,217 | 2/1985 | Yoshimura et al. | 524/588 |
| 4,526,910 | 7/1985 | Das et al. | 524/558 |
| 4,755,425 | 7/1988 | Huang | 524/847 |
| 4,772,660 | 9/1988 | Kitamura et al. | 524/847 |
| 4,885,332 | 12/1989 | Bilkadi | 524/854 |
| 4,973,612 | 11/1990 | Cottington et al. | 522/84 |

*Primary Examiner*—Melvyn I. Marquis
*Assistant Examiner*—Christopher P. Rogers
*Attorney, Agent, or Firm*—Gary L. Griswold; Walter N. Kirn; Mark A. Litman

[57] ABSTRACT

Transparent abrasion resistant coatings capable of withstanding 1000 hours of accelerated weathering are comprised of colloidal silicon dioxide particles dispersed in ethylenically unsaturated aliphatic and/or cycloaliphatic monomers that are substituted by a protic group. The coatings are useful in protecting plastic, wood, metal and ceramic surfaces.

15 Claims, No Drawings

ABRASION RESISTANT COATINGS COMPRISING SILICON DIOXIDE DISPERSIONS

This is a continuation of application Ser. No. 07/180,057 filed Apr. 11, 1988, now abandoned.

FIELD OF THE INVENTION

This invention relates to UV curable hard coating compositions and articles coated with such compositions. These coatings are comprised of the photoreaction products of liquid resins containing colloidal silicon dioxide dispersions in certain acrylate or methacrylate ester monomers or mixtures thereof. Said monomers preferably having substituted aliphatic or cycloaliphatic backbones having not more than 30 carbon atoms and wherein said substituents are protic functionalties capable of forming hydrogen and/or covalent bonds with silanol groups.

The coatings of the present invention are effective in protecting a variety of surfaces, including plastic, metal, wood, and ceramic surfaces.

BACKGROUND OF THE ART

The need for novel abrasion resistant coatings that are transparent and can withstand out-of-door weathering is for instance obviated by the ever increasing reliance on plastics as convenient substitutes for glass glazing in many out-of-door applications. Plastics, such as polyesters, polycarbonates and polymethacrylates are rapidly replacing glass in applications ranging from motorized vehicles and multistory buildings, to optical lenses for eyeglasses and precision instruments.

Although plastics have decided advantages over glass by virture of their lighter weight and increased shatter resistance, they suffer from two main drawbacks. They are much softer than glass and they are easily damaged by everyday exposure to abrasives, such as dust and cleaning equipment. They also can be severely damaged by environmental conditions such as exposure to solvents, to sunlight and to fluctuations in temperature and humidity.

It is no surprise therefore that considerable efforts have been made in the past to improve the durability of plastic articles to the dual effects of weathering and exposure to abrasives. The most commonly used method for improving the abrasion resistance of plastics is application of a top coat of a resin specifically formulated to be abrasion resistant. In most, if not all cases, the most desirable top coats for plastic articles are photochemically cured resins of high crosslink density. In particular, thermally cured protective coatings are not desirable for plastic substrates on account of the fact that the majority of thermosetting coatings require a heat cure cycle at temperatures which can cause thermal distortion or even degradation of the substrate.

Soft plastics are often protected from marring or scratching by application of a hardenable top coat especially formulated to be abrasion resistant. Examples of the most successful top coats for this purpose are certain room-temperature curing silicone resins derived from functionalized silane monomers, such as disclosed in U.S. Pat. No. 4,049,861.

U.S. Pat. Nos. 3,976,497; 3,986,997; 3,708,285; 4,368,236; 4,368,235; 4,478,876; and 4,491,508 disclose that the scratch resistance of polymers can be enhanced by coatings derived from hydrolyzable silanes and polymers derived from a combination of acryloxy functional silanes and polyfunctional acrylate monomers. The scratch resistance of these polymers can be further enhanced by addition of colloidal silica. Most likely this improvement is due to a combination of two effects brought on by the addition of colloidal silicon dioxide particles: (1) the mere substitution of part of the soft silicone resin by the much harder inorganic oxide particles that are trapped in the polymer matrix and (2) changes in the mechanical properties of the coating as a result of the "crosslinking" effect of the inorganic oxide. Whatever the mechanism may be, the addition of colloidal silica to hydrolyzable silanes and functionalized silanes is a straightforward process because the polycondensation of the siloxane is carried out in the aqueous environment of the colloidal silica. There are, however, several drawbacks associated with the utilization of hydrolyzed silanes or functionalized silanes in the formulation of abrasion resistant coatings. The first is that the shelf-life of the partially hydrolyzed silanes is often limited due to the progressive gelling of the condensation polymer, as is documented in U.S. Pat. No. 3,986,997 for example. Another drawback is that full cure of the silesquioxane to yield the highly crosslinked silicone matrix is often an extremely slow process that is only partially remedied by a catalyst or by heating. As a result of the slow cure kinetics, silane based abrasion resistant coatings are often susceptible to shrinkage and ultimately to stresscracking. Lastly, silane based hard coats suffer from poor adhesion to plastic substrates, such as polymethyl methacrylate, and require therefore some form of physical or chemical priming of the adherent surface.

Attractive alternatives to silane-based hard coats for protecting plastic substrates are compositions containing in polymerized form, one or more acrylate or methacrylate functionalities on a monomer, oligomer or resin. The popularity of acrylic or methacrylic based hard coats is due to at least three reasons: 1) they yield transparent films, and are therefore ideal for protecting substrates that need remain transparent, or possess a color that need to be visible, 2) for decorative or other functional reasons, they are easily cured at room temperature by exposure to U.V. or electron beam irradiation, which qualifies them as top coats for heat sensitive substrates, and 3) they are capable of yielding films with high crosslink density (and therefore high hardness) by virtue of the fact that more than one crosslinkable functionality may be attached to a given monomer or a given oligomer chain.

Abrasion resistant coating compositions based on multifunctional acrylate or methacrylate monomers have been disclosed in the prior art. In U.S. Pat. No. 3,968,305 there is described a plastic shaped article having a scratch-resistant polymer surface layer consisting of, in polymerized form, (a) 20 to 100 weight percent of a compound having a total of at least 3 acryloxy and/or methacryloxy groups linked with a straight chain aliphatic hydrocarbon residue and (b) 0 to 100 weight percent of at least one copolymerizable mono- or diethylenically unsaturated compound and (c) a crosslinking catalyst for thermal or U.V. radiation cure. In U.S. Pat. No. 3,968,309 there is disclosed a mar-resistant coating composition comprising at least 30 percent by weight of at least one polyfunctional methacryloyloxy or acryloyloxy compound to which is added 0.01 to 5% by weight of a fluorine-containing surfactant.

In U.S. Pat. Nos. 4,198,465 and 4,262,072 there are disclosed abrasion resistant coating formulations containing polyfunctional acrylate and/or methacrylate monomers having heterocylic hydantoin groups in the backbone and capable of hardening by exposure to U.V. light.

Despite their advantages in so far as ease of crosslinking, transparency, and hardness after cure, the abrasion resistance of top coats derived from polyfunctional acrylates or methacrylates still leaves much room for improvement, and is far inferior to the abrasion resistance of glass or most ceramic materials.

In U.S. Pat. No. 4,499,217 there are disclosed thermoset resin liquid compositions containing colloidal silica that had been freed from water and redispersed in alcohol prior to mixing with the resins. An example of an acrylic resin is used. Although the dry cured film of this composition was reported to exhibit enhanced abrasion resistance, the curing conditions required for thermosetting resins in general, including those reported in U.S. Pat. No. 4,499,217 preclude them from being used as scratch-resistant coatings for the great majority of common plastic substrates. Depending on the nature of the thermosetting resin curing times ranging from half an hour to several hours at temperatures often well exceeding 100° C. are required. Such conditions are conducive to softening, distortion and/or degradation of commercially important plastics such as polymethyl methacrylate, polyesters, polyolefins, and polycarbonates. The compositions disclosed in this patent use polymerizable resins in order to achieve high molecular weights of the coating. No monomers are used.

Photocurable abrasion resistant coating compositions comprising a non-aqueous dispersion of colloidal silica in polyethylenically-unsaturated monomer or its use to provide substrates with an improved abrasion resistant coating have not been disclosed.

SUMMARY OF THE INVENTION

It is an aspect of the present invention to provide compositions of stable, photocurable, silicone-free dispersions of colloidal silica in certain photocurable acrylate monomers. These UV curable silica organosols are clear, remain stable for periods of months when protected from light, and are derived from relatively inexpensive raw materials. When coated on plastic, wood, metal or ceramic substrates they exhibit excellent abrasion resistance and excellent resistance to degradation by weathering. Hence, it is another aspect of this invention to provide an improved abrasion resistant and weatherable coating for solid substrates, especially transparent substrates.

In accordance with the present invention, there is provided a coating composition comprising colloidal silicon dioxide particles dispersed in a protic group-substituted ester or amide of acrylic or methacrylic acid, which composition upon the addition of a photoinitiator, coating onto a substrate, and curing by exposure to actinic radiation provides coatings that are abrasion and weather resistant. There is also provided a process for preparing the coating composition.

DETAILED DESCRIPTION OF THE INVENTION

The coating composition of the invention is prepared by the process comprising the steps:

1) Providing a dispersion of one part by weight of colloidal silica particles, preferably having a particle size of less than 100 millimicrometers in diameter, in a dispersing medium comprising by weight 0 to 100 percent (preferably 0 to 70 percent) water and 100 to 0 percent, preferably 100 to 30 percent of an aliphatic alcohol having one to seven carbon atoms, preferably one to five carbon atoms and up to three ether oxygen atoms, the dispersing medium having a pH in the range of 2.5 to 7.0;

2) adding 0.1 to 10 parts, preferably 0.5 to 3 parts of one or more protic group-substituted esters or amides of acrylic acid having the general formula:

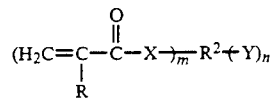

wherein

R is hydrogen, a lower alkyl group of 1 to 4 carbon atoms or halogen; preferably, hydrogen or methyl;

X is —O— or —NHR$^1$—, in which R$^1$ is hydrogen or a lower alkyl group having one to four carbon atoms;

R$^2$ is a polyvalent saturated linear, branched or cyclic aliphatic group having carbon, hydrogen and, optionally ether oxygen atoms and

groups and having a molecular weight of 14 to 1000 and a valence of m+n;

m is an integer designating the number of acrylic or methacrylic groups in the ester or amide having a value of one to five, preferably m has a value of 2 to 5 or where a mixture of acrylic or methacrylic compounds are used, m has an average value of 1.05 to 5;

n is an integer having a value of one to five; and

Y is a protic functional group capable of forming a hydrogen bond with lower aliphatic alcohols and with the silanol group of silanol group-containing compounds, the protic group, preferably selected from the group consisting of —OH, —COOH, CONHR$^3$, —COONH$_4$, —SH, —NHR$^3$, —SO$_3$H, —SO$_3$NH$_4$, —PO(OH)$_2$, and —PO(ONH$_4$)$_2$, in which R$^3$ is hydrogen or a lower alkyl group having 1 to 4 carbon atoms;

3) removing the water to obtain an anhydrous dispersion of colloidal silica in a protic group-substituted ester or amide of an acrylic acid.

In step 1) of the process for preparing the coating composition of the invention, there is provided a dispersion of colloidal silica in dispersion medium, preferably having an alcohol content of at least 30% by weight and the particle size of the silica is generally in the range of 5 to 30 millimicrons in diameter. These silica dispersions are prepared by methods well known in the art and are also available commercially under such trade names as "Ludox" TM (manufactured by E. I. duPont de Nemours and Co., Inc. Wilmington, Del, USA) or "Nalco" (manufactured by Nalco Chemical Co., Oak Brook, IL, USA). Although both alkaline and acidic forms of silica hydrosols are available commercially, only colloidal dispersions having a pH lower than 7 may be used, otherwise rapid saponification of the ester monomer would ensue. One excellent choice is "Nalco 1129" which is provided as colloidal silica dispersion in 60%/40% by weight isopropanol/water solution wherein the mean particle size is 20 millimicrons, the pH is 3.5 and the solid content is 30% by weight. Another excellent commercial starting material is "Nalco 1034A" available as a silica hydrosol with mean particle size of 20 millimicrons, pH 3.2, and solid content 34% by weight. It should be obvious to those skilled in the art, however, that any silica hydrosol, including alkaline silica hydrosols, may be used as sources of silica particles for the embodiment of this invention as long as their pH is reduced to the pH range of 2.5 to 7.0, and as long as the dispersion in a dispersion medium containing 30 to 100% aliphatic alcohol produced from them is stable against settling of the silica.

In step 2) of the process for preparing the coating composition of the invention, the alcoholic dispersion is mixed with one or more protic group-substituted esters or amides of an acrylic acid, preferably as defined by Formula I.

Preferred protic group substituted esters useful in this invention are the acrylic acid and methacrylic acid esters of aliphatic polyhydric alcohols of the general formula:

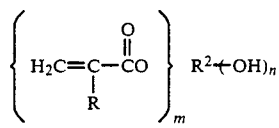

wherein R, $R^2$, m and n are defined above. Examples of such esters include 2-hydroxyethyl acrylate and methacrylate, 3-hydroxypropyl acrylate and methacrylate, 2-acryloyloxymethyl-2-hydroxymethylpropane, 2-methacryloyloxymethyl-2-hydroxymethylpropane, pentaerythritol mono, bis- and triacrylate, pentaerythritol mono-, bis-, and trimethacrylate, dipentaerythritol di-, tri-, tetra-, and pentaacrylate and methacrylate.

The above esters of polyhydric alcohols and their production are well known to those skilled in the art. For example, one method of producing a hydroxyl substituted mono, di- or triacrylate ester is by reacting acrylic acid with excess di-, tri-, or tetrahydroxy compound. Thus, for example acrylic acid can be reacted with pentaerythritol to yield a mixture of the di-, tri-, and tetraacrylate ester from which the later compound can be extracted by well known techniques to leave only the di- and triester compounds useful in this invention.

Other protic group-substituted compounds useful in this invention have the general formula:

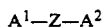

in which $A^1$ and $A^2$ independently are poly(acryloyloxy)-alkoxypropyl groups having the general formula:

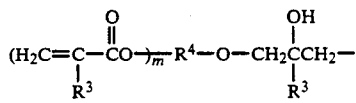

wherein:
Each $R^3$ is independently hydrogen atom or methyl group;
m is an interger of 1 to 5;
$R^4$ is the residue of an aliphatic polyol having (m+1) primary hydroxyl groups (said residue being formed by the removal of hydroxyl groups from the polyol) and containing 1 to 10 carbon atoms, preferably one to two quaternary carbon atoms, a valence of (m+1), and optionally one ether oxygen atom, most preferably an alkanol residue; and
Z is a heterocyclic group of the formula:

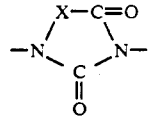

wherein:
X is a divalent group which is required to complete a five or six membered heterocyclic ring, preferably X is

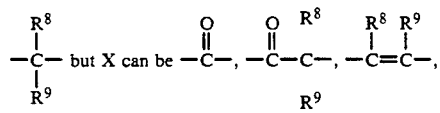

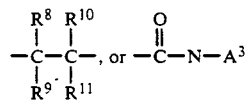

wherein $R^8$, $R^9$, $R^{10}$ and $R^{11}$ are independently hydrogen or lower (1 to 12 carbon atoms) alkyl, preferably methyl, cycloalkyl (3 to 6 carbon atoms) or a phenyl group (preferably up to 16 carbons and most preferably up to 10 carbons atoms) and $A^3$ is as defined above for $A^1$ and $A^2$; in $A^1$, $A^2$, and $A^3$, m is preferably 3.

The synthesis of the above poly(ethylenically unsaturated alkoxy)hydantoin compounds has been described in detail in U.S. Pat. No. 4,262,072. One route is the Lewis acid catalyzed reaction of ethylenically unsaturated primary hydroxy compounds with N-glycidyl substituted hydantoin compounds.

In the practice of the present invention, the acrylate monomers are first dissolved in a lower aliphatic alcohol such as ethanol or isopropanol to form a 20 to 40% solution which is then added to the colloidal silica dispersion and the solvents subsequently removed, as for example by distillation.

The protic substituents on the aliphatic residues of the acrylate monomers conforming to formula I assure the solubiltiy of the acrylate esters and amides in alcohol and the formation of a stabilizing adsorptive layer of the said acrylate esters on the silica particle surface.

Examples of still other protic group-substituted esters and amides that can be used in the coating composition are the reaction product of diglycidyl ethers and esters with acrylic and methacrylic acid such as 2,2-bis[4-(3-acryloyloxy-2-hydroxypropoxy)phenyl]propane; the acryloyloxy and methacryloyloxy substituted aliphatic carboxylic acids such as 2-acryloyloxyacetic acid and 2-methacryloyloxyacetic acid; the ammonium and amine salts of these acids such as ammonium 2-acryloyloxyacetate and ammonium 2-methacryloyloxyacetate; the amides of these acids such as 2-acryloyloxyacetamide and 2-methacryloyloxyacetamide; acryl- and methacrylamido substituted aliphatic carboxylic acids, their ammonium salts and amides such as 2-acrylamidoacetic acid and 3-methacrylamidopropionic acid; the polyacryloyloxy- and polymethacryloyloxy-substituted mono and polycarboxylic acids such as 2,3-bisacryloyloxypropionic acid, 2methacryloyloxy succinic acid, and 2,3-bisacryloyloxysuccinic acid; the acrylic and methacrylic esters and amides of mercapto-aliphatic alcohols and amines such as 2-mercaptoethyl acrylate and methacrylate, N-(2-mercaptoethyl)acrylamide and N (2-mercaptoethyl)methacrylamide; the acryl- and methacrylaminoalkanols and alkylamines such as 2-acrylaminoethanol and 2-methacrylaminioethylamine; the acryloyloxy- and methacryloyloxy aliphatic sulfonic acids such as 2-acryloyloxyethanesulfonic acid and its ammonium salt; and the acryloyloxy- and methacryloyloxy aliphatic phosphonic acids such as acryloyloxyethanephosphonic acid and its ammonium salt.

In step 3) of the process for preparing the coating composition of this invention, the alcohol-water solvent is completely removed from the mixture prepared in step 2) above. Suitable methods for removing the water-alcohol solvent are, for example, simple distillation or vacuum distillation. When all the water-alcohol is thus removed at temperatures between 65° C. and 85° C., stability of the organosol is assured by the so-called "steric hindrance" effect whereby a layer of strongly adsorbed substituted acrylate monomers shields each silica particle and prevents it from agglomerating with other particles.

One important advantage of redispersing the colloidal silica in the said acrylate monomers is the ability to work with a so-called solventless system, thereby eliminating the need for potentially cost-adding pollution abatement measures required to dispose of the solvent. However, the photocurable compositions of this invention may easily be diluted with ketones or alcohols.

The crosslinkable silica organosols thus obtained may be diluted with up to 3 parts by weight of any ethylenically unsaturated monomers having saturated aliphatic or cycloaliphatic residues. In particular, it is not necessary that these monomeric diluents have protic substituents on their aliphatic residues. Preferably, the majority of comonomers are at least diethylenically unsaturated monomers. Generic classes include the acrylates, methacrylates, acrylic anhydrides, acrylated alkoxysilanes and siloxanes, ethylenically unsaturated anhydrides, acrylamides, ethylenically unsaturated amides and urethanes and acrylated epoxies. Particularly suitable ethylenically unsaturated monomers include hexamethylene diacrylate and dimethacrylate, glycerol diacrylate and methacrylate, trimethylolpropane triacrylate, neopentylglycol diacrylate, pentaertythritol tetraacrylate and tetramethacrylate, dipentaerythritol hexaacrylate, 1,3,5-tri(2-methacryloxyethyl)-s-triazine, glycidyl acrylate and methacrylate, and functional silanes such as
3-methacryloxypropyltrimethoxysilane,
3-acryloxypropyltrimethoxysilane,
2-methacryloxyethyltrimethoxysilane,
2-acryloxyethyltrimethoxysilane,
3-methacryloxypropyltrimethoxysilane,
3-acryloxypropyltriethoxysilane,
2-methacryloxyethyltriethoxysilane, and
2-acryloxyethyltriethoxysilane.

Preferably 20 to 85% and most preferably 45 to 60% by weight of copolymerizable components comprise the protically substituted acrylate monomers of the coating composition of the invention.

Other agents that can be incorporated in the composition of the present invention include flatting agents, surface active agents, protic solvent soluble organic polymers, dyes, and especially UV light stabilizers including hindered amines derived from substituted piperidines or triazoles.

The photocurable compositions also contain appropriate photosensitizers specially formulated to effect crosslinking either in air or in inert atmosphere, such as nitrogen. In general the amount of photosensitizer may vary from 0.01% to 10% by weight, but for thin films 4%-5% by weight is preferred.

For photocuring thin film coatings of the compositions in air, suitable photosensitizers consisting of mixtures of ketone type and hindered amine type compounds are used. Among the preferred ketones are benzophenone, acetophenone, benzil, benzaldehyde and o-chlorobenzaldehyde, xanthone, thioxanthone, 9,10-anthraquinone, and many other aromatic ketones. Among the preferred hindered amines are methyldiethanolamine, ethyldiethanolamine, dimethylethanolamine, diethylethanolamine, triethanolamine, phenylmethylethanolamine, dimethylaminoethylbenzoate, and others. Preferred ratios by weight of ketone to amine are between 80/20 and 20/80, but in general ratios of 50/50 to 60/40 are satisfactory.

For effecting photocure in inert environments, such as nitrogen or argon, many commercially available photosensitizer compounds are known, among which those known under the trade name Irgacure ™ (available from Ciba-Geigy Co.), for example Irgacure 184.

UV irradiation at dosages of from 1 megarad to 100 megarad or more are used. The UV radiation used may have a wavelength ranging from 18.5 to 400 nm. Suitable sources of radiation include mercury, xenon, carbon arc and tungsten filament lamps, sunlight, etc.

SUBSTRATES

Although the substrates of soft plastic sheet material show the greatest improvement upon application of the coating, the composition can be applied to other substrates, such as wood, ceramics, leather, metals, printed surfaces, marble, and textiles. The substrates may be substantially any form, such as sheets, films, fibers, fabrics, and shaped solid objects. Amongst the substrates having particular advantages with coatings of the present invention are polymeric resins, including both thermoplastic and thermoset resins (e.g. polyesters, polyethers, polyamides, polyurethanes, polyacrylates, polyolefins, polyvinyls, cellulose esters, epoxy resins, phenolic resins, polysiloxanes, polystyrene, copolymers of acrylonitrile-styrene, butyrates, and the like). Suitable substrates are also ceramics, including glass, fused ceramic sheeting, marble, wood, leather, textiles, and printed or imaged surfaces. The coatings are useful particularly on refractive surfaces, such as prisms and lenses, and reflective surfaces, such as street signs, mirrors, etc. They are also useful on metallized polymeric film which is transparent and used as a light screen on windows. Particularly useful substrates for application of the present invention would be those requiring transparent protective coatings. Finished photographic prints, and films, paintings, transparencies, car windshields, instant film, photothermographic and thermographic paper and film, photoconductive substrate, opthalmic lenses, polarizing elements, liquid crystal displays, motion picture film, street and traffic signs, reflective surfaces, retroreflective surfaces, traffic lights, and many other surfaces are usefully coated according to the practice of the present invention.

Although the coating compositions of this invention are such that they yield highly adhering protective films on most substrate surfaces, separate primer compositions, comprising a single ingredient or mixture of ingredients, may be used to improve the bond of the coating to the substrate. Texturizing, chemical, or physical treatment of the surface may also be used to improve bonding. The coatings of this invention are generally between 0.5 and 500 microns thick, preferably between 1 and 50 microns, and most preferably between 3 and 25 microns.

Objects and advantages of this invention are further illustrated by the following examples, but the particular materials and amounts thereof recited in these examples, as well as other conditions and details, should not be construed to unduly limit this invention.

EXAMPLE 1

In a 500 ml round bottom flask was dissolved 90 g of pentaerythritol triacrylate (PETA) in 100 g ethanol. To this solution was added with agitation 150 g Nalco 1129 colloidal silica (sold as 30% by weight $SiO_2$ solids in 40/30 isopropanol/water at pH 3.5). A free radical inhibitor was added (0.1 g of a 1% ethanolic solution of phenothiazine). The round bottom flask was then attached to a Buchi 011 Rotavap and the alcohol-water removed by distillation at 47° C. under vacuum until a very thick but clear gel was obtained. The gel was redissolved in 300 g of anhydrous ethanol and the distillation carried out for a second time at 47° C. until crystal like deposits appeared on the side of the flask. In a third step, the powder was redissolved in 300 g of anhydrous ethanol and distillation carried out for a third and final time at 47° C. until no further solvent could be extracted. The temperature was then raised to 85° C. for half an hour and the resulting residue was a clear, anhydrous, highly viscous organosol that weighted 99 g. The silica content of this organosol (heretofore called Compound A) was 66.6% by weight.

10 g of A were mixed with 30 g of anhydrous ethanol, 0.2 g of Tinuvin ™ 770, an ultraviolet light stabilizer (Ciba-Geigy Corp.), and 0.2 g of Irgacure ™ 184 (Ciba-Geigy Co.) photoiniator. The resulting clear dispersion was coated on a 4 mil thick unprimed polyethylene terephthalate (PET) film manufactured by Minnesota Mining and Manufacturing using a #9 Meyer rod (a wire-wound drawdown rod manufactured by RD Specialities, Rochester, N.Y.). Upon evaporation of the solvent the coating was cured by irradiation under nitrogen gas in a UV Processor, Model No. QC 120N/A (manufactured by Radiation Polymer Co.) at a rate of 80 ft/minute (27 m/min) under a 165 watts/centimeter high pressure mercury lamp. The cured layer exhibited 95–100% cross-hatch adhesion (ASTM D 3359-83).

Abrasion tests were performed on 7.5 cm diameter disks using the Taber Abraser Model 503 equipped with CS 10F wheels which are resurfaced every 100 cycles by abrading for 10 cycles on S-11 refacing disks. Each abrasing wheel supports a 500 g weight during operation. The haze measurements were performed on a Gardner Hazemeter equipped with a motorized rotating disk support. The percent change in haze on the wear track is the average reading over a full rotation of the disk. Results of the abrasion tests are shown in Table II.

Accelerated weathering tests were performed with an Atlas Weather-O-Meter Type XW and a QUV Weathering Tester according to ASTM Specifications #G-23 Type E and #G-53 respectively. In #G-23 Type E weathering procedure, the sample is repeatedly cycled through 108 minutes of Sunshine Carbon Arc light exposure and 18 minutes of Sunshine Carbon Arc light exposure together with deionized water spray. In the #G-53 procedure every 8 hours of fluorescent light exposure is followed by 4 hours of deionized water condensation. Resistance to weathering was evaluated by visual inspection of the coating surface and by measuring the cross-hatch adhesion of the coating after 1000 hours exposure to light and moisture. The latter test involved rapid 180 degrees pull of an aggressive pressure sensitive adhesive tape (3M #610 tape) on a crisscrossed pattern on the coating consisting of twenty 5 mm × 5 mm squares. Results of these tests are shown in Table II.

Examples 2, 3 and Comparative Example X

Example 1 was repeated using ratios of PETA and Nalco 1129 to provide PETA/silica compositions having a silica content of 50% and 33.3% respectively for Examples 2 and 3 and zero percent silica for comparative example X. Coating compositions were prepared for each example, coated onto PET film, and the cured coatings evaluated as in Example 1. The results are shown in Table I. The result with uncoated polyester film (PET) is also shown in Table I.

TABLE I

| Ex. No. | Composition % PETA | % $SiO_2$ | Haze % (Cycles) (100) | (500) | (1000) | X-Hatch Adhesion* | Weathering Visual Inspection* |
|---|---|---|---|---|---|---|---|
| 1 | 66.6 | 33.3 | 2.7 | 8.9 | 18 | 95–100 | Smooth |
| 2 | 50 | 50 | 2.1 | 5.7 | 8.1 | 95–100 | Smooth |
| 3 | 33.3 | 66.6 | 2.1 | 7.3 | 10.1 | 95–100 | Fair |
| X | 100 | 0 | 2.4 | 11.2 | 23.1 | 5 | Cracked |
| Uncoated polyester | | | 26.1 | | | | |

*After 1000 hours of weathering by #G-23 Type E procedure according to ASTM D-3359-83

EXAMPLE 5

One part of Compound A was diluted with 2 parts by weight ethanol and mixed with 0.02 parts by weight benzophenone and 0.02 parts by weight dimethylethanolamine. The resulting clear liquid was coated using #9 Meyer bar on 75 micrometer thick unprimed polyethylene terephthalate sheets (manufactured by Minnesota Mining and Manufacturing), dried at room temperature, and then UV cured in air at the rate of 12.7 cm/sec without need for a nitrogen gas blanket. The hardened coating exhibited exactly the same abrasion resistance and cross-hatch adhesion after weathering as Example 1.

EXAMPLE 6

50 g of Compound A and 1.5 g of Irgacure ™ 184 were mixed thoroughly with 50 g of trimethylolpropane triacrylate (TMPTA). The resulting mixture was a clear, stable sol having a viscosity of 75,000 centipose.

One part of the above mixture was added to two parts of methyl ethyl ketone. The resulting clear dispersion was coated on a 4 mil thick unprimed polyethylene terephthalate film manufactured by Minnesota Mining and Manufacturing using a #9 Meyer rod. Upon evaporation of the solvent the coating was radiation cured under a nitrogen gas blanket as in Example 1. The cured layer exhibited 95-100% cross-hatch adhesion as opposed to 65% cross-hatch adhesion of unmodified TMPTA. The cured layer exhibited superior abrasion resistance and weatherability as shown in Table I.

EXAMPLES 7-18

Example 6 was repeated using the substrates listed in Table III. In all cases excellent cross-hatch adhesion and resistance to chemical etching by methylene chloride were observed. The results are shown in Table II.

TABLE II

| Example No. | Subtrate | Haze (%) | X-hatch Adhesion | CH$_2$Cl$_2$ Rub[a] |
|---|---|---|---|---|
| 7 | Polyester (PET) | 2.1-2.7 | 95-100% | Pass |
| 8 | Primed PET | 2.1-2.7 | 95-100% | Pass |
| 9 | Poly(methyl methacrylate) | 2.1-2.7 | 95-100% | Pass |
| 10 | Poly(vinyl chloride) | 2.1-2.7 | 95-100% | Pass |
| 11 | Epoxy[b] | 2.1-2.7 | 95-100% | Pass |
| 12 | Corona treated polyethylene | 2.1-2.7 | 65-80% | Pass |
| 13 | Nylon 66 | 2.1-2.7 | 95-100% | Pass |
| 14 | Glass | 2.1-2.7 | 95-100% | Pass |
| 15 | Polyurethane | 2.1-2.7 | 95-100% | Pass |
| 16 | Aluminum | — | 95-100% | Pass |
| 17 | Wood | — | 95-100% | Pass |
| 18 | Brass | — | 95-100% | Pass |

[a]The cured coating was rubbed with a cheese cloth wet with methylene chloride. The coating passed the test when no damage to the coating could be observed.
[b]Polymer obtained by polymerization of diglycidyl ether of Bisphenol A using 0.25% SbF$_5$

EXAMPLE 19

Hydroxyethyl acrylate (66.7 g) were added to 444 g of Nalco 1129 colloidal silica and the low boiling liquids (water and isopropanol) removed at 80° C. using a Bucchi Rotavap. The residual silica organosol (designated Compound B), was colorless viscous liquid weighing 200 g. that was 66.6% by weight colloidal silica and 33.3% by weight hydroxyethyl acrylate.

One part of Compound B was mixed with one part pentaerythritol triacrylate, 0.02 parts Irgacure 651 photoinitiator, and 0.02 parts Tinuvin TM 236, an ultraviolet radiation stabilizer (Ciba-Geigy). The mixture was diluted with two parts by weight methyl ethyl ketone and coated on a 5 mil thick Lexan TM polycarbonate sheet using a #9 Meyer rod. UV cure was effected at 30.5 cm/sec in a nitrogen atmosphere under high pressure lamps. The hardened film withstood 1000 hours of accelerated weathering on the Wether-O-Meter using the procedure described in Example 1. The coating also exhibited 100% cross-hatch adhesion and 3.9% Taber haze after 100 cycles on the Taber Abraser using CS10F abraser wheels. Each abrasing wheel supported a 500 g weight during operation.

I claim:

1. A coating composition curable to an abrasion and weather resistant coating comprising a non-aqueous dispersion of colloidal silicon dioxide particles of diameters less than 100 millimicrometers in a protic group-substituted ester or amide of acrylic or methacrylic acid wherein the protic group-substituted ester or amide or acrylic acid is one or more compounds having the formula:

$$A^1-Z-A^2$$

wherein $A^1$ and $A^2$ independently are poly(acryloyloxy)-alkoxypropyl groups having the general formula:

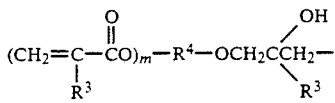

in which
each $R^3$ is independently a hydrogen atom or methyl group;
m is an integer of 1 to 5;
$R^4$ is the residue of an aliphatic polyol having (m+1) primary hydroxyl groups (said residue being formed by the removal of hydroxy groups from the polyol) and containing 1 to 10 carbon atoms and optionally one ether oxygen atoms; and
z is a heterocyclic group of the formula:

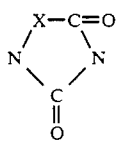

wherein
X is a divalent group which is required to complete a five or six membered heterocyclic ring.

2. The coating composition of claim 1 wherein the colloidal silicon dioxide particles are particles having a diameter of 5 to 30 millimicrometers.

3. The coating composition of claim 2 wherein the colloidal silicon dioxide is present at a concentration of 30 to 70 percent by weight and the protic group-substituted ester or amide is present at a concentration of 70 to 30 percent by weight and a degradation resistance improving amount of an ultraviolet radiation stabilizer.

4. The coating composition of claim 1 further comprising an ester or amide of acrylic or methacrylic acid unsubstituted by a protic group.

5. The composition of claim 4 wherein the protic group-substituted ester or amide of acrylic or methacrylic acid present in the mixture is 20 to 85 weight percent of the total weight of both protic group substituted and unsubstituted ester or amide of acrylic or methacrylic acid and the ester or amide of acrylic or methacrylic acid unsubstituted by a protic group present in the mixture is 80 to 15 weight percent of the total weight of both protic group-substituted and unsubstituted ester or amide of acrylic or methacrylic acid.

6. The coating composition of claim 1 wherein the average number of acrylic and methacrylic groups in the substituted and unsubstituted esters and amides present in the composition is from 1 to 5.

7. The coating composition of claim 1 wherein the average number of acrylic and methacrylic groups present in the composition is from 1.05 to 3.0.

8. A substrate bearing a layer of the cured compositions of claim 1.

9. A substrate bearing a layer of the cured compositions of claim 2.

10. A substrate bearing a layer of the cured compositions of claim 3.

11. A substrate bearing a layer of the cured compositions of claim 4.

12. A substrate bearing a layer of the cured compositions of claim 4.

13. A substrate bearing a layer of the cured composition of claim 1.

14. The coating composition of claim 3 wherein said stabilizers are selected from the group consisting of hindered amines derived from substituted piperidines, substituted triazoles, and mixtures thereof.

15. A substrate bearing a layer of the cured compositions of claim 14.

* * * * *

UNITED STATES PATENT AND TRADEMARK OFFICE
CERTIFICATE OF CORRECTION

PATENT NO. : 5,104,929
DATED : April 14, 1992
INVENTOR(S) : Zayn Bilkadi It is certified that error appears in the above-identified patent and that said Letters Patent is hereby corrected as shown below:

Col. 12, line 1     "or" should read -- of --

Signed and Sealed this

Fourteenth Day of September, 1993

Attest:

BRUCE LEHMAN

*Attesting Officer*     *Commissioner of Patents and Trademarks*